United States Patent [19]

von Haas

[11] Patent Number: 4,860,429

[45] Date of Patent: Aug. 29, 1989

[54] AUTOMATIC TOOL CHANGING DEVICE

[75] Inventor: Rainer von Haas, Geesthacht, Fed. Rep. of Germany

[73] Assignee: Fried. Krupp Gesellschaft mit beschränkter Haftung, Essen, Fed. Rep. of Germany

[21] Appl. No.: 210,564

[22] Filed: Jun. 23, 1988

[30] Foreign Application Priority Data

Jun. 24, 1987 [DE] Fed. Rep. of Germany ....... 3720805

[51] Int. Cl.$^4$ ............................................. B23Q 3/157
[52] U.S. Cl. ........................................ 29/568; 414/736
[58] Field of Search ................ 29/568, 26 A; 82/36 B, 82/36 A; 414/736, 729; 279/1 TS; 294/106, 87.1, 103.1, 104

[56] References Cited

U.S. PATENT DOCUMENTS

| 2,374,919 | 5/1945 | Bruseth | 29/26 R |
| 2,654,407 | 10/1953 | Dremel | 144/32 |
| 4,406,195 | 9/1983 | Kruger et al. | 82/36 B |
| 4,581,811 | 4/1986 | Eckle | 29/568 |
| 4,615,244 | 10/1986 | Reiter et al. | 82/36 B |
| 4,715,753 | 12/1987 | Tack | 82/36 B X |
| 4,761,877 | 8/1988 | Rupp | 29/568 |

FOREIGN PATENT DOCUMENTS

| 0125529 | 11/1984 | European Pat. Off. | |
| 213399 | 3/1987 | European Pat. Off. | 29/568 |
| 3532667 | 3/1987 | Fed. Rep. of Germany | 29/568 |
| 145201 | 11/1980 | German Democratic Rep. | 29/568 |
| 186343 | 9/1985 | Japan | 29/568 |
| 146444 | 7/1986 | Japan | 29/568 |
| 168442 | 7/1986 | Japan | 29/568 |
| 1085751 | 4/1984 | U.S.S.R. | 29/568 |
| 8502138 | 5/1985 | World Int. Prop. O. | 29/568 |

OTHER PUBLICATIONS

Gerhard Scheer, "Automatische Werkzeug-Wechselsysteme mit zentraler, radialer Spannkrafteinleitung", Werkstatt und Betrieb 119 (1986), pp. 797-801.

Primary Examiner—William Briggs
Attorney, Agent, or Firm—Spencer & Frank

[57] ABSTRACT

A tool changing device for tool systems in which a tool head and a tool holder are connected with one another by means of an automatic clamping mechanism which includes an integrated clamping screw. The tool changing device includes a lifting carriage which is movable on several axes and a rotatably mounted, motor driven pivot arm which is mounted on the lifting carriage. The pivot arm has a free end which is equipped with a gripper holder having at least four tool locations and an integrated clamping shaft. Both ends of the clamping shaft are provided with profiles which permit transfer of torques. The clamping shaft can be moved axially in such a manner that it can be coupled with the clamping screw of a tool holder either from the left or from the right.

16 Claims, 4 Drawing Sheets

AUTOMATIC TOOL CHANGING DEVICE

BACKGROUND OF THE INVENTION

The present invention relates to a device for changing and releasing or clamping in the tool in tool systems in which a tool head and a tool holder are connected together by means of a clamping unit. The invention relates, in particular, to such tool systems in which the clamping screw of the clamping unit is integrated in the tool holder.

For such machine tools, too changing devices are known in which a gripping element takes the tool out of the basic tool holder and inserts a new one. A clamping unit installed in the machine tool releases and clamps in the tool. Releasing and clamping in of the tool are effected manually.

U.S. Pat. 4,581,811 discloses a tool changing device in which the clamping screw is operated by an automatic device stationarily attached to the machine tool. The machine tool is provided with a tool holder receptacle having a central bore into which a tool holder can be inserted, the tool holder being equipped with a cylindrical section for engagement of a changing arm. The tool holder is connected with the tool receptacle by means of a clamping unit including a clamping screw. The cylindrical section of the tool holder is equipped with a radial, threaded bore. At the free end of a changing arm which operates independently of the machine tool, there is disposed a motor-driven connecting bolt which is provided with an external thread matching the threaded bore of the cylindrical section of the tool holder. To change the tool, the connecting bolt of the changing arm is automatically screwed into the radial, threaded bore of the tool holder. The threaded bore and the connecting bolt are connected together in the correct position by way of prism-shaped centering recesses provided at the outer end of the changing head. A motor-driven screwdriver stationarily provided at the machine tool loosens the clamping screw in the tool receptacle. The tool is removed by the changing arm and an identical changing head disposed on the changing arm diametrally opposite the old tool head is attached. Then the screwdriver tightens the clamping screw again.

It is a drawback of this device that the exchange and release or tightening of the tool is performed by means of two separate devices. Not all machine tools provide sufficient space for a screwdriver to be attached stationarily on the machine. Another drawback of the above-described tool changing device is that right and left tool arrangements require appropriately adapted embodiments of this device. Thus, this tool changing device is not universally usable. Finally, it is a further drawback of the system that the changing arm provides no more than two locations for changing heads. Thus, for machine tools having tool receptacles able to accommodate a plurality of exchanging heads, the tool change times are lengthened considerably.

SUMMARY OF THE INVENTION

It is therefore an object of the present invention to provide a tool changing device for a machine tool in which the changing head and the tool receptacle are connected together by means of an automatic clamping unit equipped with an integrated clamping screw which permits automatic releasing and tightening as well as exchanging of tools arranged axially or radially to the machine axis by means of a single device which is independent of the machine tool, is able to service left-hand and right-hand tool arrangements equally well, and provides for more than two locations for changing heads.

The invention solves this problem in that a rotatably mounted pivot arm is disposed at a lifting carriage which is movable on several axes. An associated drive permits cadenced movement of the pivot arm into any desired angle. At the free end of the pivot arm there is disposed a gripper holder having at least four tool locations. Additionally, a clamping shaft is integrated in the pivot arm and is provided at both its ends with a profile able to transmit torques. This clamping shaft can be moved axially in such a manner that it can be coupled with the clamping screw of a tool holder either on the left or on the right.

DESCRIPTION OF THE PREFERRED EMBODIMENT

Figure 1A:
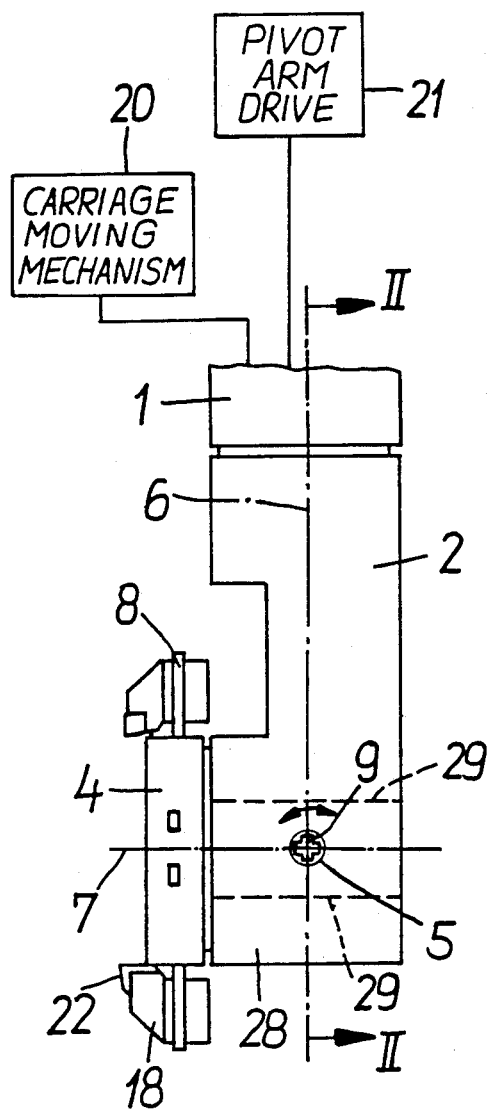
FIGS. 1a and 1b are two different views of an automatic tool changing device in accordance with the present invention, and show a lifting carriage and a pivot arm which is equipped with a gripper holder and a clamping shaft.
Figure 1B:
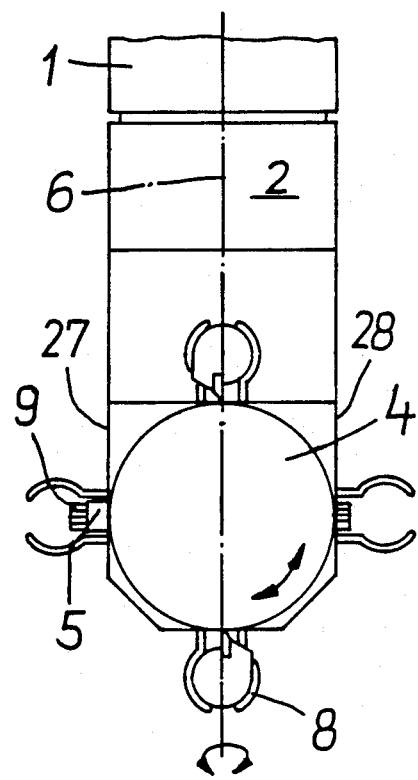

The tool changing device shown in FIGS. 1a and 1b is composed of a lifting carriage 1 to which is fastened a pivot arm 2. Pivot arm 2 is equipped with a gripper holder 4 and is penetrated by a clamping shaft 5.

The lifting carriage 1, which operates independently of the machine tool (not illustrated), may be moved on one, two, or three axes by carriage moving mechanism 20. The pivot arm 2 has a square cross section and is mounted on lifting carriage 1 so as to be pivotal about an axis 6. The drive 21 for pivot arm 2 may advantageously be integrated in the lifting carriage 1. Drive 21 rotates pivot arm 2 by angular increments, such as 180°, 90°, or any other desired angle.

At the lower end of pivot arm 2, on one of the four sides, there is attached a gripper holder 4 which is rotatable about an axis 7. The gripper holder 4 is equipped with at least four tool grippers 8 for selectively receiving and releasing tool heads, such as tool head 18 having a cutting tool 22. In the horizontal plane, perpendicular to axis 7, the pivot arm 2 is penetrated by a motor driven, axially displaceable clamping shaft 5. Each end 9 of the clamping shaft 5 has a profile which enables it to transmit torques.

Figure 2:
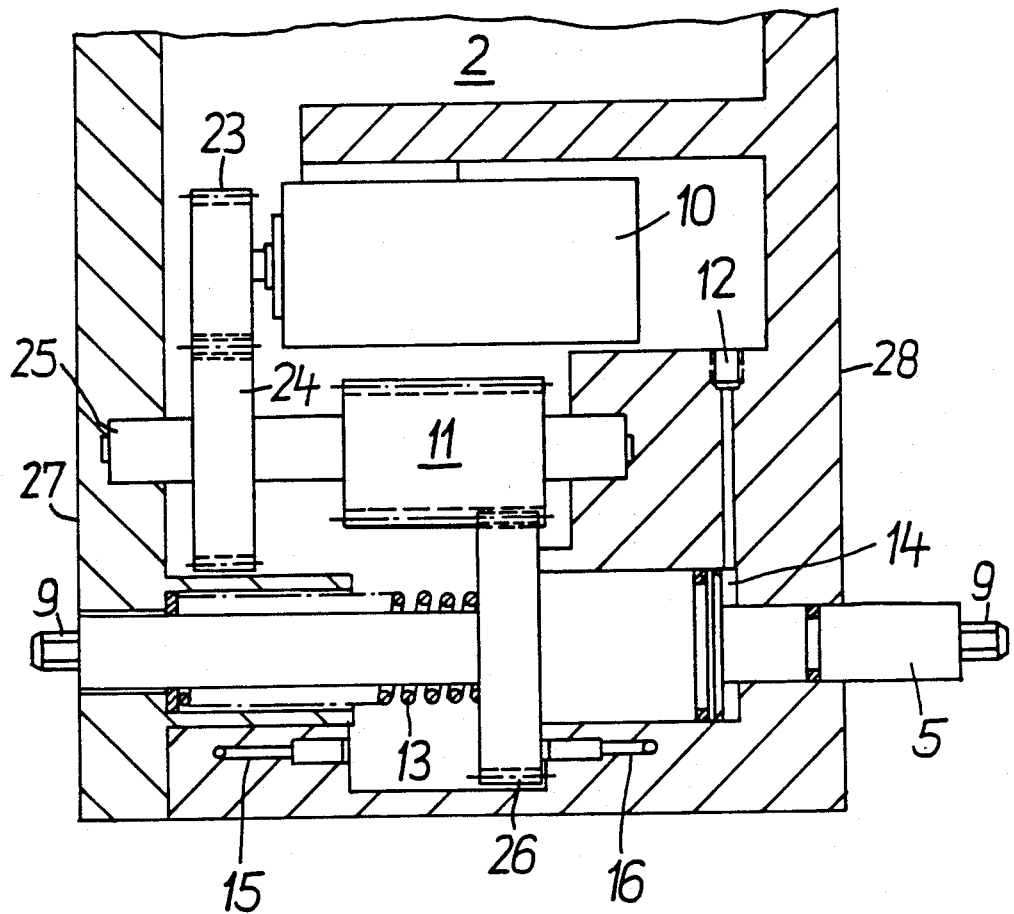
FIG. 2 is a vertical sectional view through plane II—II of FIG. 1.

FIG. 2 is a cross-sectional view of the lower part of pivot arm 2, and shows the clamping shaft 5, an associated drive for rotating clamping shaft 5, and a mechanism for shifting shaft 5 axially.

The drive for rotating clamping shaft 5 includes a motor 10 which is mounted within pivot arm 2. A gear 23 is mounted on the shaft of motor 10, which preferably has a predetermined maximum torque (as by providing a built-in clutch which slips when the predetermined maximum torque is exceeded) and is rotatable either clockwise or counterclockwise. Gear 23 meshes with a gear 24 affixed to rotatably mounted shaft 25. Elongated gear 11 is also mounted on shaft 25. A gear 26 affixed to clamping shaft 5 meshes with gear 11. As a result, rotary motion from motor 10 is transferred via gears 23, 24, 11, and 26, to shaft 9.

The mechanism for shifting shaft 5 axially includes a pneumatic connection 12 and a spring 13 (a portion of which is shown in dot-dash lines). If the pneumatic connection 12 is charged with compressed air, chamber 14 is filled with air and clamping shaft 5 is moved to the left out of the pivot arm 2 against the force of spring 13. Because gear 11 is elongated, it remains in meshing relationship with gear 26. Once the flow of compressed air ceases, spring 13 pushes bit clamping shaft 5 back into the illustrated position. Accordingly, it will be apparent that the shifting mechanism permits one end 9 of shaft 5 to be selectively extended from side 27 of pivot arm 2, or the other end 9 to be selectively extended from the other side 28 of pivot arm 2. End sensors 15 and 16 are used to detect the axial position of clamping shaft 5.

Returning to FIGS. 1a and 1b, it will be seen that the ends 9 are spaced apart from the gripper holder 4 but are aligned with the grippers 8 when gripper holder 4 is in the position illustrated. Either end 9 can be extended to participate in a tool changing operation, depending upon whether side 27 or side 28 is moved next to the tool holder (not shown in FIGS. 1a and 1b). To conduct a tool changing operation, pivot arm 2 is moved so that a tool exchange region on the appropriate side of arm 2 lies parallel to the tool holder (the tool exchange region for side 28 is the region between dotted lines 29 in FIG. 1a). The tool changing operations will be explained in more detail with reference to FIGS. 3 and 4.

Figure 3:
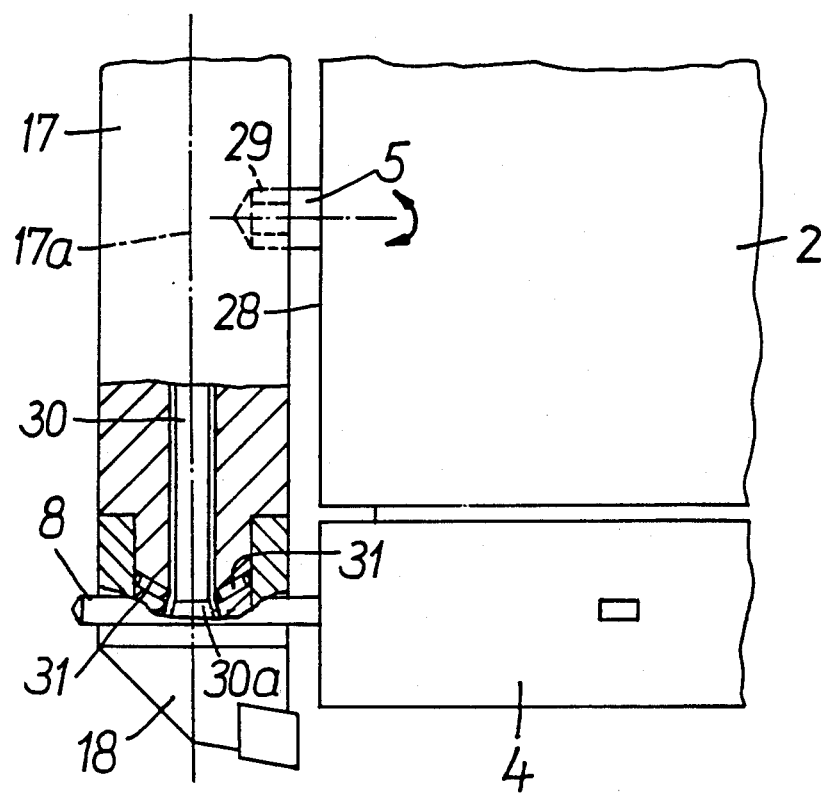
FIGS. 3 and 4 are schematic illustrations showing steps in the change of tool heads.

In FIG. 3, pivot arm 2 has been moved so that the appropriate side (side 28 in this example) lies adjacent the tool holder 17 and so that the tool exchange region for that side (corresponding to the region between dotted lines 29 in FIG. 1a) is parallel to the tool holder 17. In this position, the tool head 18 disposed in tool holder 17 can be seized by gripper 8. Furthermore tool holder 17 includes a clamping unit having a clamping screw (described below) with a tensioning socket 29 which is positioned to receive the end 9 (see FIG. 2) of shaft 5. The end 9 is moved axially into socket 29 while shaft 5 is slowly rotated. Socket 29 has a periphery which mates with that of end 9, so that the rotation of shaft 5 can be transferred to the clamping unit whithin tool holder 17. The clamping unit uncouples the tool head 18 from the tool holder 17.

In the tool holder 17 is integrated a clamping unit having a clamping screw 30, which is movable in longitudinal direction, and locking pins 31; these form an angle with the longitudinal axis 17a of the tool holder 17.

Figure 4:
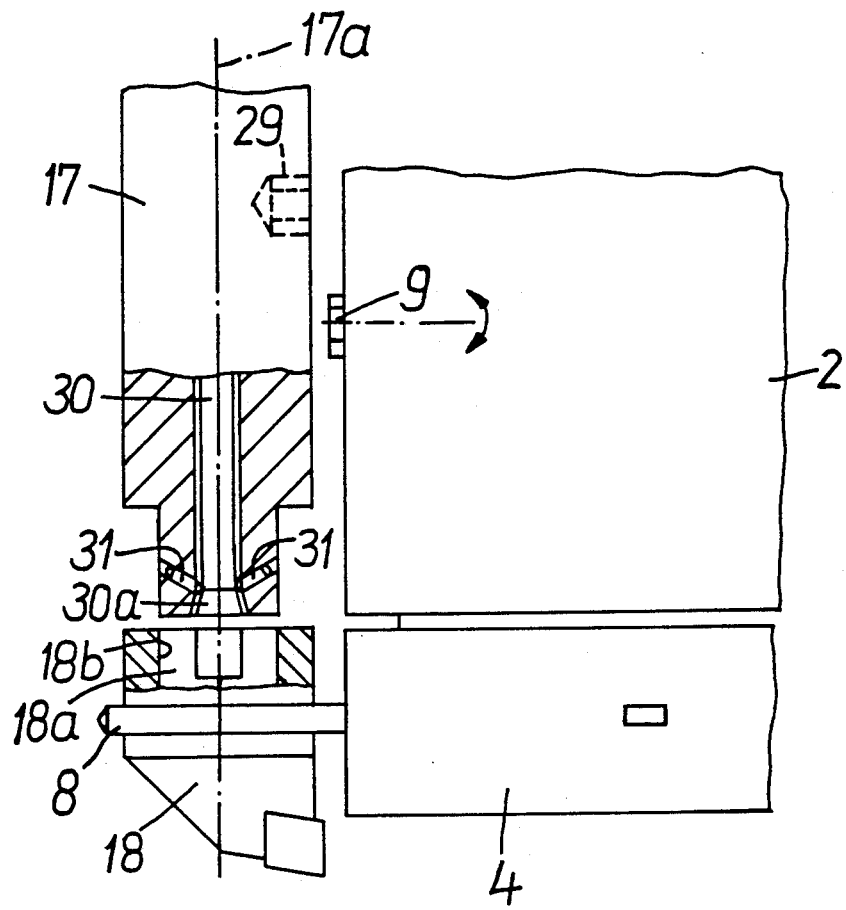

On the side facing the tool head 18, the clamping screw 30 has a conical head 30a which serves to press the locking pins 31 against the wall 18b of bore 18a in the tool head 18 (cf. FIG. 4). The connection between tool head 18 and tool holder 17 is effected by moving the clamping screw 30 away from the tool head 18 and thereby shifting the locking pins 31 radially outwardly, i.e. towards the wall 18b.

The removal of the tool head 18 is made possible by a movement of clamping screw 30 in the reverse direction (i.e. in FIG. 3 downwards). As a result of this movement, the locking pins 31 can slide inwardly in the direction of the longitudinal axis 17a.

The structure and functions of the clamping screw 30 and the locking pins 31 are in detail prescribed in the U.S. Pat. Nos. 4,406,195 and 4,615,244 (the clamping screw there being designated as locking bar or clamping bar respectively), the entire disclosure of which is incorporated herein by reference.

In FIG. 4, the end 9 has been withdrawn and tool head 18 has been separated from tool holder 17. This separation can be accomplished either by axial displacement of tool holder 17 or by moving gripper holder 4 away from tool holder 17. The gripper holder 4 is then rotated and a new tool head is inserted into tool holder 17 and clamped-in in the reverse order of steps.

The particular advantage of the present invention is that for tool changing devices in which the clamping screw of an automatic clamping mechanism is disposed in the tool holder, the exchange of tool heads can be performed by a pivot arm in which tool grippers and a system for actuating the clamping mechanism are integrated. With this device, the exchange of tools or tool heads can be performed fully automatically by means which operate independently of the machine tool.

Another advantage of the device according to the invention is that the rotatable mounting of the pivot arm permits a pivoting movement over any desired angle, so that tool holder locations disposed axially as well as radially with respect to the machine axis can be reached. In conjunction with the clamping shaft configured according to the invention, which makes it possible, in particular, to actuate left-hand as well as right-hand tool holder changing systems, it is possible in practice to operate all tool holder systems arranged at different angles in one plane.

The present disclosure relates to the subject matter disclosed in Federal Republic of Germany patent application No. P 37 20 805.5 of June 24th, 1987, the entire disclosure of which is incorporated herein by reference.

It will be understood that the above description of the present invention is susceptible to various modifications, changes and adaptations, and the same are intended to be comprehended within the meaning and range of equivalents of the appended claims.

What I claim is:

1. A tool changing device for changing tool heads in a tool system in which a tool head and a tool holder are releasably connected together by a clamping mechanism in which a clamping screw is integrated in the tool holder, said tool changing device comprising:
   gripper means for carrying the tool heads;
   actuating means for actuating the clamping mechanism to selectively clamp and unclamp the tool heads, the actuating means including an axially displaceable clamping shaft having two ends and having means at both ends for engaging a clamping mechanism; and
   a rotatably mounted support on which the gripper means and the actuating means are mounted.

2. The device of claim 1, further comprising a lifting carriage, and wherein the support is a pivot arm which is rotatably mounted on the lifting carriage.

3. The device of claim 2, wherein the lifting carriage is movable about three axes.

4. The device of claim 2, wherein the pivot arm is rotatable by 360° with respect to the carriage.

5. The device of claim 4, wherein the rotation of the pivot arm with respect to the lifting carriage occurs in predetermined angular increments.

6. The device of claim 2, wherein the gripper means comprises a gripper holder which is rotatably mounted on the pivot arm.

7. The device of claim 6, wherein the gripper holder is rotatable by 360° with respect to the pivot arm.

8. The device of claim 7, wherein the rotation of the gripper holder with respect to the pivot arm occurs in predetermined angular increments.

9. The device of claim 6, wherein the gripper holder comprises more than two tool head grippers.

10. The device of claim 2, wherein the pivot arm comprises a pair of spaced-apart sides and the clamping shaft extends the entire distance between the sides, the clamping shaft protruding from the pivot arm through an opening in one of the sides.

11. The device of claim 10, wherein axial displacement of the clamping shaft causes the clamping shaft to protrude from the pivot arm through the other of the pair of sides.

12. The device of claim 1, wherein the means at both ends of the clamping shaft comprises couplable profiles at the ends.

13. The device of claim 1, wherein the actuating means further comprises a motor to rotate the clamping shaft.

14. The device of claim 13, wherein the clamping shaft is rotatable clockwise and counterclockwise by the motor.

15. A tool changing device for use with a tool holder to exchange a tool head mounted at an end of the tool holder, the tool holder having a rotatably mounted element which is spaced apart from the end and having clamping mechanism means responsive to the rotatably mounted element for selectively clamping and unclamping the tool head, said tool changing device comprising:

a support which is movable with respect to the tool holder, the support including first and second opposing sides having opening and a third side which connects the first and second sides;

a gripper holder mounted on the third side of the support, the gripper holder being rotatable about an axis which runs midway between the first and second sides of the support and having a plurality of gripper means for selectively clasping and releasing tool heads; and actuating means mounted on the support for actuating the clamping mechanism means to selectively clamp and unclamp the tool head, the actuating means including a clamping shaft which is mounted on the support so as to be axially movable through the openings in the first and second sides of the support and which is positioned to engage the rotatably mounted element of the tool holder when a gripper means is positioned to clasp a tool head disposed at the end of the tool holder, wherein one of the rotatably mounted element and the clamping shaft has a socket and the other of the rotatably mounted element and the clamping shaft has an end which is configured to lockably engage the socket.

16. The device of claim 15, wherein the actuating means further comprises means for axially shifting the clamping shaft toward either of the first and second sides of the support, and means for rotating the clamping shaft in either of the clockwise and counterclockwise directions.

* * * * *